United States Patent Office.

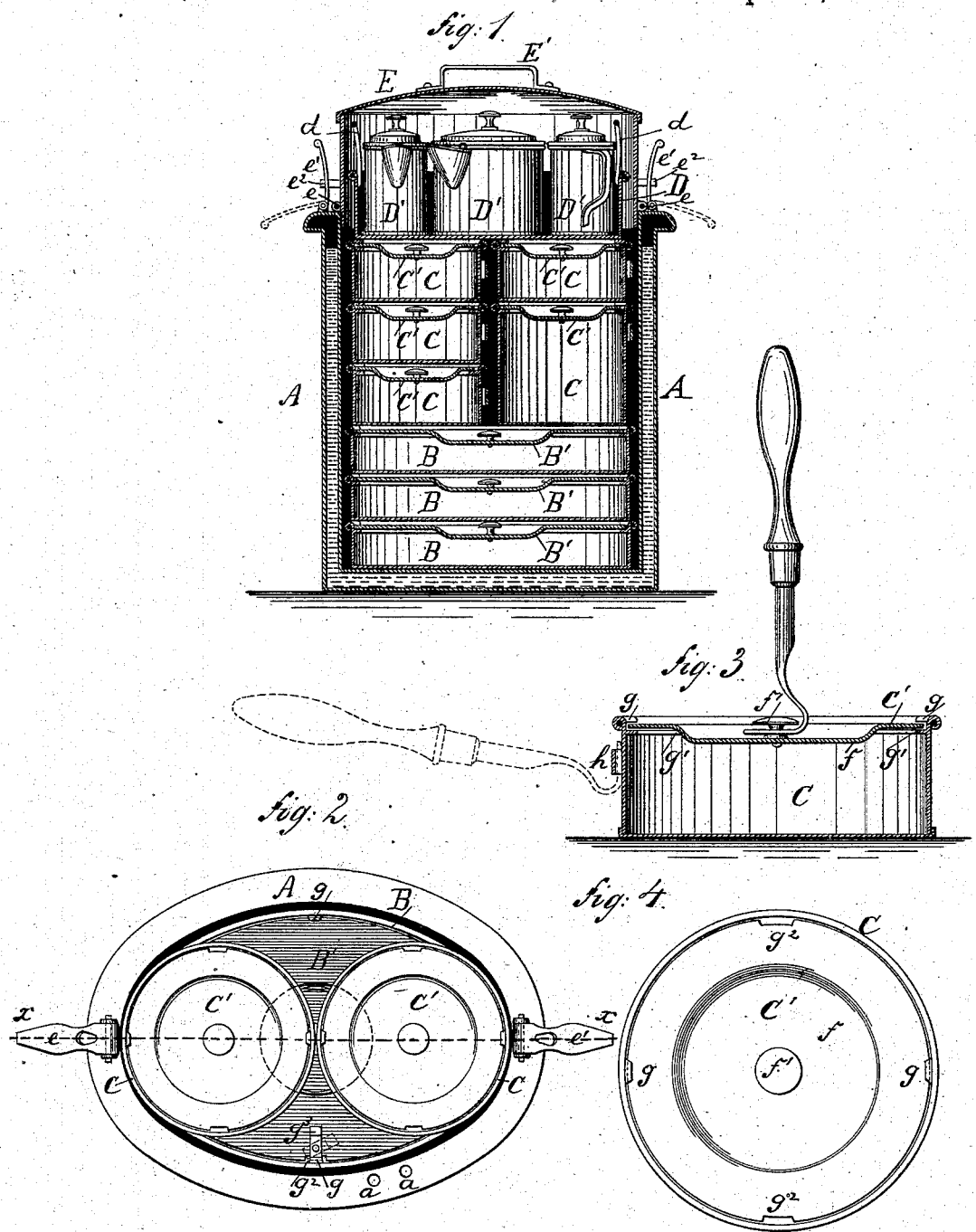

FRANZ NEUMÜLLER AND JAMES P. WHEDON, OF NEW YORK, AND EMIL M. PERHÁCS, OF BROOKLYN, N. Y.

DINNER-TRAY.

SPECIFICATION forming part of Letters Patent No. 296,043, dated April 1, 1884.

Application filed August 24, 1883. (No model.)

*To all whom it may concern:*

Be it known that we, FRANZ NEUMÜLLER and JAMES P. WHEDON, both of the city, county, and State of New York, and EMIL M. PERHÁCS, of Brooklyn, Kings county, and State of New York, have invented certain new and useful Improvements in Dinner-Trays, of which the following is a specification.

This invention has reference to an improved dinner-tray, which is designed to be used in connection with the caterer's wagon for which Letters Patent have been granted to us, dated April 10, 1883, and numbered 275,516; and the invention consists of an exterior casing having a hot-water jacket, in which the dishes containing the meals are placed, and which is provided at its upper part with a detachable cover and means for attaching the cover. The dishes at the lower part of the casing are equal in size with the interior shape of the casing, while the dishes at the upper part have a diameter equal to half the length of the greater axis of the lower dishes. The covers of the dishes have central depressions for the knobs, which are on or below a level with the edges of the dishes. The covers are retained on interior shoulders of the dishes by suitable locking devices.

In the accompanying drawings, Figure 1 represents a vertical longitudinal section of our improved dinner-tray on line $x\ x$, Fig. 2. Fig. 2 shows a top view of the same with the cover and top tray removed, and Figs. 3 and 4 represent a vertical central section and a top view of one of the dishes drawn on a larger scale.

Similar letters of reference indicate corresponding parts.

Referring to the drawings, A represents a casing of oval, cylindrical, oblong, or other suitable shape. We prefer to make the casing a hot-water jacket, by which the meals can be kept warm longer. At the upper edge of the jacket A are arranged steam-escape holes $a\ a$, to prevent any danger of explosion. In the interior of the casing A a series of dishes containing the meal are placed. The dishes B at the lower part of the casing are made of a shape and size corresponding to the interior configuration of the casing, so as to fit into the same. They are intended to be used as platters for roast meat, fish, &c. Above the same are arranged smaller dishes, C, which are to be used for soup, vegetables, gravy, pudding, &c. On the dishes C is supported a tray, D, having upright handles $d$, said tray being used for the pots D', in which coffee, tea, milk, chocolate, &c., are served. A detachable cover, E, is connected to the top of the casing A by suitable locking devices. After all the dishes have been placed into the casing in the order stated the cover E is placed into position on the casing until an exterior rim, $e$, of the cover rests on the top of the casing. At opposite points of the top of the casing A are arranged hinged straps $e'$, which serve to engage projecting lugs $e^2$ of the cover E, thus locking the cover and the casing firmly together, so that the entire dinner-tray can be carried by the handle E' at the top of the cover E. The large-sized dishes or platters B at the lower part of the casing A fill up the entire interior space of the same, while the dishes C at the upper part, being preferably of a cylindrical shape, have a diameter that is equal to one-half of the longer axis of the bottom dishes or platters, B. The dishes C form thereby contact with the casing and with each other, whereby the rattling or shifting of the same in the casing while being carried about is obviated. The dishes B and C are provided with sheet-metal covers B' and C', having a circular depression, $f$, at the center, so that the wooden or other knobs $f'$ are on or below a level with the side walls of the dishes, thus allowing the dishes to rest one upon the other. The upper edges of the dishes B and C are provided with short inwardly-projecting lugs $g$, and with an inwardly-projecting circumferential flange or seat, $g'$, below said lugs, upon which flanges the covers B' and C' are supported. The covers B' of the dishes B are provided with an edge recess, $g^2$, at one side, that corresponds in size with the lugs $g$, and with a pivoted latch, $g^3$, that locks below one of the lugs $g$ after the cover B' has been placed below the lug $g$ at the opposite side of the dish B. The covers C' of the dishes C are provided with edge recesses $g^2$, that correspond in size with the lugs $g$. By taking hold of the knob $f'$ the cover C' is first so held that its recesses $g^2$ register with the lugs $g$. The cover is then lowered until it rests upon the flange $g'$, and then turned on its axis, so that the lugs shall overlap the edge of the cover, thus holding it securely on the dish. For removing the hot dishes B and C from the casing or hot-water jacket A, a handle with a bent and forked end is used, that is placed below the knob $f'$, after which the dish is lifted out, as shown in Fig. 3. At the side of the dishes a loop, $h$, is arranged, into which the bent end of the forked handle is inserted, as shown in dotted lines in Fig. 3, so as to support the dishes after they have been removed from the casing without taking hold of them with the hands.

When the dinner-tray is not in use, the water can easily be removed from the hot-water jacket by inverting it after the dishes have been taken out.

The advantages of our invention consist in providing a convenient dinner-tray in which the meals can be kept hot for a considerable length of time after they have been prepared and sent from the central kitchen to the apartments or residences of the customers.

Having thus described our invention, we claim as new and desire to secure by Letters Patent—

1. A dinner-tray consisting of an exterior casing, bottom dishes or platters of a shape and size to fit the interior of the casing, and smaller dishes above the same, the diameter of which is equal to half the length of the longer axis of the bottom dishes, substantially as set forth.

2. A dinner-tray consisting of an exterior jacketed casing, larger bottom dishes fitting the interior of the casing, smaller dishes above the same, having a diameter equal in length to one-half of the longer axis of the bottom dishes, a top tray fitting the interior of the casing, and a detachable cover, substantially as specified.

3. A dinner-tray consisting of an exterior jacketed casing, larger bottom dishes or platters, intermediate smaller dishes, a top tray, a cover, and means for attaching the cover, substantially as set forth.

4. A dinner-tray consisting of an exterior casing, interior dishes or platters having covers with depressed knobs, and means to retain said covers, a top tray, a detachable cover, and means for attaching the cover, substantially as specified.

In testimony that we claim the foregoing as our invention we have signed our names in presence of two subscribing witnesses.

FRANZ NEUMÜLLER.
JAMES P. WHEDON.
EMIL M. PERHÁCS.

Witnesses:
PAUL GOEPEL,
CARL KARP.